Figure 1:
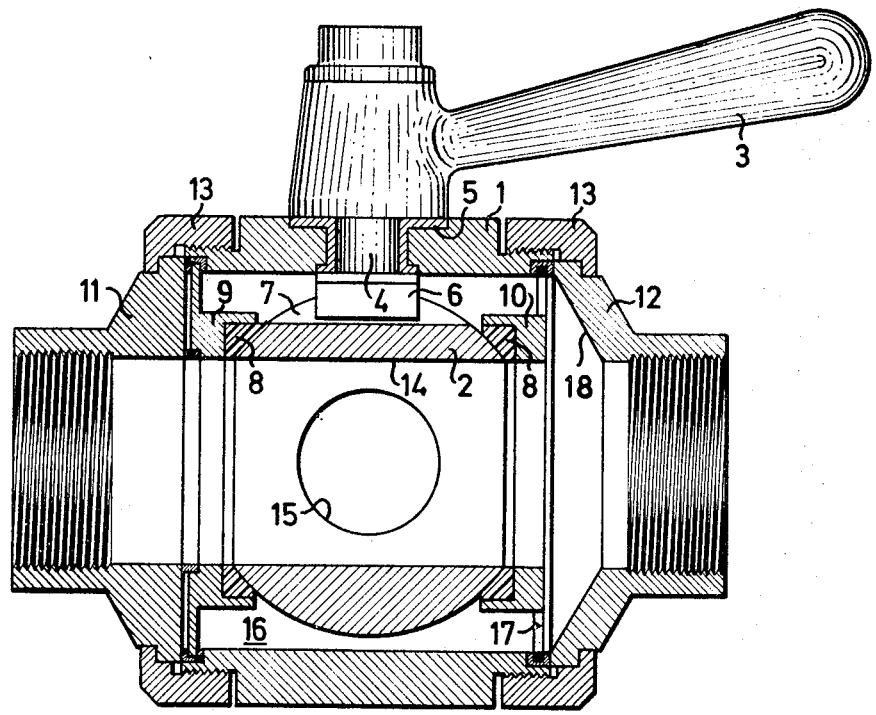

United States Patent

[11] 3,525,352

| [72] | Inventor | Willy Henry Jensen<br>Buddingevej 29C, Lyngby, Denmark |
|---|---|---|
| [21] | Appl. No. | 677,986 |
| [22] | Filed | Oct. 25, 1967 |
| [45] | Patented | Aug. 25, 1970 |
| [32] | Priority | Nov. 1, 1966 |
| [33] | | Denmark |
| [31] | | 5,673/66 |

[54] BALL VALVE
6 Claims, 5 Drawing Figs.

[52] U.S. Cl. .................................................. 137/238
[51] Int. Cl. .................................................. F16k 51/00
[50] Field of Search .......................................... 251/315,
317, 309; 137/238, 237

[56] References Cited
UNITED STATES PATENTS

| 934,614 | 9/1909 | Huxley ......................... | 137/238X |
| 2,603,232 | 7/1952 | Keammerer ................. | 137/238X |
| 2,883,146 | 4/1959 | Knox ............................ | 251/315X |
| 3,036,600 | 5/1962 | Vickery ....................... | 251/315X |

*Primary Examiner* — M. Cary Nelson
*Assistant Examiner* — Michael O. Sturm
*Attorney* — Beveridge and De Grandi

ABSTRACT: A valve having a valve body and a ball-shaped valve member rotatably supported therein, said valve member having an open and a closed position plus a cleaning position in which latter position there is a flow passage extending between the valve inlet and outlet and including the normal flow passage through the valve member as well as the space defined between the valve body and valve member.

INVENTOR

WILLY HENRY JENSEN

BY Browne, Schuyler + Beveridge.
ATTORNEYS

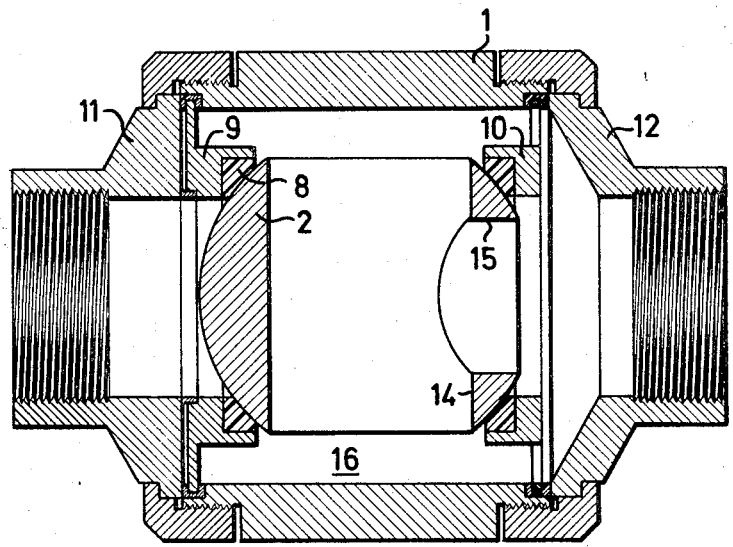
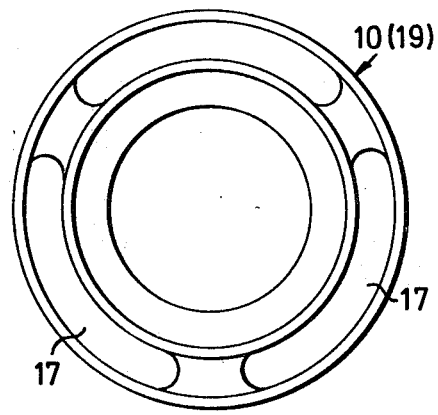
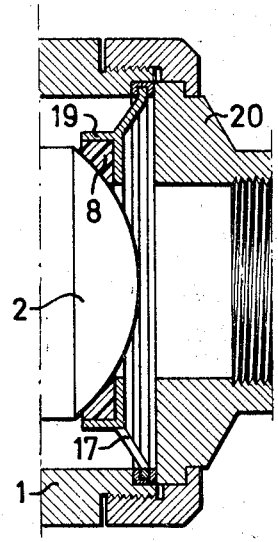

3,525,352

BALL VALVE

This invention relates to a ball valve, i.e. a valve of the type comprising a valve body having two connecting orifices, viz. an inlet and an outlet, respectively, and a ball-shaped valve member rotatably disposed in said body and having a first duct which in one position of the valve member establishes a communication between the inlet and the outlet.

Valves of this type have certain advantages over plug cocks and disc or flap valves and have, therefore, lately found increasing application. Compared with disc valves they open and close faster, and like plug cocks they allow a substantially loss-free flow in the open position, whereas unlike plug cocks they are not subject to leakage on account of wear or to seizure between plug and body, in that sealing of the valve member can be provided by resilient non-metallic seals which engage the ball-shaped valve member around the valve body connecting orifices.

Heretofore known ball valves are, however, encumbered with the same drawback as plug cocks, namely that they are difficult to clean satisfactorily without disassembly, and this condition has up to this day prevented the use of the valves, inter alia in the food industries, in pipes for milk, beer, juice, wine, or other liquids, and also in other installations where it is important that the piping and valves can be kept clean, although the favourable qualities referred to above would per se make the valves well-suited for such purpose.

It is an object of the invention to provide a valve of the type referred to which in a fully satisfactory manner can be cleaned in situ without requiring disassembly of the valve member etc., and the applicability of which is, consequently, increased. According to the invention the valve body or the valve member is provided with a second duct which in a second position of said valve member establishes a passage from one connecting orifice of the valve body to the space between the body and the valve member, in which second position of the valve member a passage is established from the first duct to the other connecting orifice of the valve body, preferably through a third duct.

Thereby it is attained, whilst retaining the relatively large cross-sectional area of the first duct ensuring free flow in the opening position, that in said second position of the valve member wherein the direct passage through the first duct is shut off, a flow path is established which between the inlet and outlet of the valve body, extends through both the first duct and the space in the valve body around the valve member. When flushing the associated piping system with a suitable cleaning fluid, said fluid is thus forced through the internal ducts and spaces of the valve and provides a vigorous flushing thereof, notably the space in the valve body around the valve member, which in prior art valves has been practically impossible to clean perfectly with the valve member in situ. Whilst this space has previously been regarded as a noxious space in which sludge and dirt may collect and bacterial growth develop, the communication of this space with the first duct in the closed position has, according to the invention, been utilized for providing an effective flushing of this space and the duct simultaneously, only by turning the valve member from the opening position into a cleaning position.

Said second duct may be provided in a ring located at one connecting orifice of the valve body and comprising a hub with a central flow passage surrounded by a seal for the valve member. Compared with a duct provided in the valve member, which also is within the scope of this invention, the advantage is attained that the ball-shaped valve member which in addition to the opening and cleaning positions must have a closing position, may be provided with a first duct having a maximum cross-sectional area of flow in relation to the outer dimensions of the ball and, consequently, also to those of the valve.

The second duct may be constituted by one or more arcuate slits arranged around the hub of the ring. Alternatively, the ring may be polygonal or star-shaped so that the duct is consituted by gaps between the outer diameter of the ring and the inner wall of the valve body.

The portion of the ring radially disposed outside the hub may be conical. This brings the advantage that the portion of the valve body or of a connecting branch secured to said body engaging the outside of the ring may be provided with a plane end face.

Figure 2:
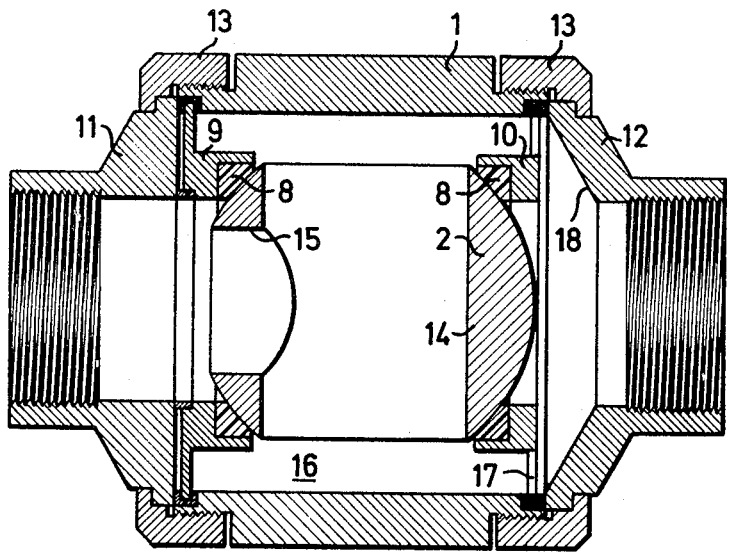

The invention is described in more detail below with reference to the accompanying drawings, in which:

FIG. 1 is a longitudinal section through a straightway valve according to the invention, shown in the open position, FIG. 2 is a longitudinal section through the same valve at right angles to the section shown in FIG. 1 and with the valve member in the cleaning position, FIG. 3 is a section corresponding to that of FIG. 2 in the closed position of the valve, FIG. 4 is a plan view of one sealing ring of the valve, and FIG. 5 is a part section of the valve shown in FIG. 2 with a modified sealing ring.

The valve shown in FIGS. 1—3 has a substantially cylindrical valve body 1 in which a ball-shaped valve member 2, the diameter of which is a little less than the inner diameter of the body may be rotated by means of an external handle 3. Handle 3 is secured to a stem 4 which extends through the wall of body 1 and is sealed with respect thereto by means of a seal 5, and the inner end of the stem is in the shape of a driving dog 6 engaging a longitudinal slit 7 in valve member 2.

Ball-shaped valve member 2 is located and fixed in the valve body by means of two annular seals 8 having spherical or conical sealing and guiding faces, and being each retained in a sealing ring 9 and 10, respectively. At their outer diameters the two sealing rings are retained in recesses in the end faces of valve body 1 by two connecting branches 11 and 12, respectively, axially secured of means of union nuts 13. The outer edges of said sealing rings may, as shown, be embraced by U-shaped seals ensuring tightness at this location. Like seals 8, these last-mentioned seals may be made of polytetrafluoroethylene or other suitable material having a low coefficient of friction towards metal and which comply with the requirements of sanitary installations.

By means of connecting branches 11 and 12 the valve may, in a known manner, be connected to a piping system not shown, the adjoining pipe ends of which may e.g. be rolled, welded or screwed into said branches. In the direction of flow indicated by arrows in FIG. 1, branch 12 is an inlet branch and branch 11 an outlet branch, but the valve may also be used with the opposite direction of flow.

Valve member 2 incorporates an axially through-channel or duct 14, the cross-sectional area of which corresponds to the cross-sectional areas of seals 8 and associated sealing rings 9 and 10 and to the cross-sectional flow area of connecting branches 11 and 12. Thus, in the open position of valve 1, shown in FIG. 1, there is provided a substantially loss-free flow through bore or duct 14. A transverse bore or duct 15 extending from duct 14 connects duct 14 with space 16 between valve member 2 and body 1 in the open position, FIG. 1. Moreover, space 16 is in permanent communication with the pipe associated with inlet branch 12, as the sealing ring 10 has a number of apertures 17, and the end face of connecting branch 12 is conically shaped as shown at 18. In FIG. 4 apertures 17 are shown as milled or punched arc-shaped slits around the hub of ring 10, but any other suitable shape of apertures providing an appropriate large area of flow may also be employed. Alternatively, ring 10 may have a star-shaped or polygonal outline with rectilinear or concave sides thereby providing passage orifices between the outer diameter of the ring and the inner wall of valve body 1.

Connecting branch 11 at the opposite end of the valve body has a plane end face and associated sealing ring 9 is unbroken so that no communication exists between space 16 and the associated pipe at this end of the valve body.

When, by means of handle 3, valve member 2 is turned 90° from the position shown in FIG. 1 into the position shown in FIG. 2, the valve member shuts off the inflow through the central opening in ring 10 and seal 8, and duct 14 is in communication with space 16 at both ends. Transverse duct 15 extending from duct 14 connects the latter duct to outlet branch 11. When in this position of the valve member, a cleaning fluid which, if desired, may contain solvents or desinfectants, is sent through the pipe associated with connecting branch 12, said fluid will flow into space 16 through apertures 17 and further on from space 16 through ducts 14 and 15 to outlet branch 11. Thus, in this position of the valve member it is possible, without disassembly of said valve member, to provide an effective flushing and cleaning of all the interior of the valve, including space 16 around the valve member as well as the internal ducts 14 and 15 of the valve member.

FIG. 3 shows the closing position of the valve where in the valve member 2 is turned 180° from the position shown in FIG. 2, so that duct 15 faces inlet branch 12. This inlet branch is, consequently, in communication with space 16 between the valve member and the valve body, but since the latter space has no communication with outlet branch 11, and since the opening in ring 9 and associated seal 8 are closed by the valve member, there is no flow through the valve.

FIG. 5 illustrates an embodiment of the valve which is identical with the embodiment described above apart from the shape of the ring, here designated by 19, in which seal 8 at the valve inlet side is located, and inlet branch 20. Ring 19 has flow passages 17 like ring 10, but these passages are located in a conical portion of the ring between the outer diameter and the hub thereof, which affords the posibility of providing inlet branch 20 with a plane end face like outlet branch 11 shown in FIGS. 1 to 3 without the risk of said branch obturating the flow passages in the sealing ring. This embodiment has the advantage that the two connecting branches may be identical so that during assembly no interchange can occur that would prevent the intended flow through the valve body in the cleaning position.

Above it has been explained that the apertured sealing ring is located at the inlet side of the valve but there is nothing to prevent the valve from being used with the opposite direction of flow, as the flushing in the cleaning position is not dependent on the direction of flow. Also, it comes within the scope of this invention to omit one or both of the rings shown which retain the seals of the valve member, and instead locate said seals directly in the valve body which, if so, should be provided with corresponding flow passages for cleaning fluid at one end thereof. Instead of openings in the valve body or in the sealing rings, the flow could as well be established by means of one or more ducts or channels in the valve member proper. Such channels should be shaped and located so as to create, in the valve position in which the additional duct in the valve member—which duct is inoperative in the open valve position—is connected to either the inlet or outlet of the valve body, a communication between the opposite connecting orifice of the body and the space between the body and the valve member. The invention may also be applied to valves which are provided with a seal only on one side of the valve ball, and wherein the space surrounding the ball consequently always communicates with one of the two connecting orifices of the valve body.

It will also be appreciated that the invention is not limited to straight-way valves, but may also find application in for example angle-way valves or three-way valves, if the ducts or channels referred to above are accordingly designed. In the embodiment shown in the drawings it may be advantageous to shape the apertured sealing ring so that, when fitted, it has a certain axial pre-load against the valve member to compensate for wear and minor deformations of the sealing material. Dependent on the way in which the valve is mounted in the associated piping system, it may occur that after the flushing operation a small amount of fluid may remain at the bottom of the valve body. If this is not permissible, a drain screw or drain tap may be fitted at the lowermost point of the valve body.

I claim:

1. A valve comprising a valve body having an inlet orifice and an outlet orifice, a ball-shaped valve member rotatably disposed in said valve body, means for rotating said valve member between a first and a second position thereof relative to said valve body, said second position being spaced substantially 90° from said first position, a space surrounding said valve member in said valve body and means connecting said space with a first of said orifices in said body, a first duct extending through said valve member in a plane normal to the rotational axis thereof to provide a communication passage between said inlet and outlet orifices in said first position of said valve member, and a second duct in said valve member extending substantially in a radial direction from said first duct to the outer surface of said valve member in the same normal plane as said first duct and substantially perpendicular to the axis of said first duct.

2. A valve as claimed in claim 1, in which said means connecting said space with said first orifice comprises a ring located at said first orifice and having a hub with a central flow passage, sealing means for said valve member surrounding said central passage and apertures in said ring radially outside said sealing means.

3. A valve as claimed in claim 2, in which said apertures comprise at least one arcuate slit.

4. A valve as claimed in claim 2, in which said ring is polygonal whereby said apertures are formed between the sides of said ring and a wall of said valve body.

5. A valve as claimed in claim 2, in which said ring is stellate whereby said apertures are formed between the sides of said ring and a wall of said valve body.

6. A valve as claimed in claim 2, in which at least the portion of said ring located radially outside said hub is conical.